(12) United States Patent
 Kirkpatrick et al.

(10) Patent No.: US 9,909,354 B1
(45) Date of Patent: Mar. 6, 2018

(54) DOOR APPARATUS WITH BOOM ASSEMBLY

(71) Applicants: Michael Wayne Kirkpatrick, Buckeye, AZ (US); Justin D. Scheller, Laveen, AZ (US)

(72) Inventors: Michael Wayne Kirkpatrick, Buckeye, AZ (US); Justin D. Scheller, Laveen, AZ (US)

( * ) Notice: Subject to any disclaimer, the term of this patent is extended or adjusted under 35 U.S.C. 154(b) by 8 days.

(21) Appl. No.: 15/239,463

(22) Filed: Aug. 17, 2016

Related U.S. Application Data

(63) Continuation-in-part of application No. 14/702,956, filed on May 4, 2015, now Pat. No. 9,500,359, which is a continuation of application No. 13/573,059, filed on Aug. 17, 2012, now Pat. No. 9,021,744.

(51) Int. Cl.
| | |
|---|---|
| *E06B 3/50* | (2006.01) |
| *F23M 7/00* | (2006.01) |
| *E05D 15/48* | (2006.01) |
| *E06B 3/70* | (2006.01) |
| *E05D 15/58* | (2006.01) |

(52) U.S. Cl.
CPC ............ *E06B 3/5054* (2013.01); *E05D 15/48* (2013.01); *E05D 15/58* (2013.01); *E06B 3/509* (2013.01); *E06B 3/7015* (2013.01); *F23M 7/00* (2013.01)

(58) Field of Classification Search
CPC ..... E05D 15/48; E05D 15/482; E05D 15/485; E05D 15/487; E06B 5/11; E06B 5/12; E06B 5/16; E06B 5/18; E06B 3/5054; E06B 3/50; E06B 3/509; F23M 7/00

USPC .......... 49/150, 153, 154, 176, 194–196, 425
See application file for complete search history.

(56) References Cited

U.S. PATENT DOCUMENTS

| | | | | |
|---|---|---|---|---|
| 704,887 | A * | 7/1902 | Low ........................ | E05F 17/00 160/181 |
| 1,381,958 | A * | 6/1921 | Banks .................... | F22B 37/221 220/327 |
| 1,712,509 | A * | 5/1929 | Miller ...................... | F23M 7/00 110/173 R |
| 1,881,287 | A * | 10/1932 | Miller ...................... | F23M 7/00 110/108 |
| 2,584,404 | A * | 2/1952 | Webb ...................... | F23M 7/00 110/173 R |
| 3,312,016 | A * | 4/1967 | Tillman ................... | B60J 5/062 49/218 |
| 4,016,820 | A * | 4/1977 | Johnson .................. | F23M 7/00 110/173 R |

(Continued)

*Primary Examiner* — Justin B Rephann
(74) *Attorney, Agent, or Firm* — Michael W. Goltry; Robert A. Parsons; Parsons & Goltry

(57) ABSTRACT

A door apparatus includes a door frame, a boom mounted rotatably to the door frame, a truck mounted reciprocally to the boom, and a door mounted rotatably to the truck. The door is in a closed position received by the door frame, when the boom is rotated toward the door frame and the Door is rotated to an infacing position relative to the door frame. The door is in an open position withdrawn from the door frame, when the boom is rotated away from the door frame. The truck is disabled from reciprocating along the boom and the door is disabled from rotating, when the door is in the closed position. The truck is enabled for reciprocating along the boom and the door is enabled for rotating, when the door is in the open position.

9 Claims, 18 Drawing Sheets

(56) References Cited

U.S. PATENT DOCUMENTS

| | | | | | |
|---|---|---|---|---|---|
| 4,305,227 | A | * | 12/1981 | Georgelin | E05D 15/48 49/141 |
| 4,685,586 | A | * | 8/1987 | Lewis, Jr. | E06L 35/12 220/213 |
| 4,796,543 | A | * | 1/1989 | Barkley | F23M 7/00 110/173 R |
| 6,412,221 | B1 | * | 7/2002 | Emsbo | B01J 3/03 292/256.75 |
| 7,389,610 | B1 | * | 6/2008 | McMakin | E06L 35/12 110/173 R |
| 8,136,851 | B2 | * | 3/2012 | Nelson | E05B 63/246 292/198 |
| 8,225,721 | B2 | * | 7/2012 | Hunter | B61D 7/22 105/377.06 |
| 8,443,549 | B2 | * | 5/2013 | Salvietti | E05D 15/48 49/118 |
| 2012/0153790 | A1 | * | 6/2012 | Hammer | E06B 5/18 312/322 |

\* cited by examiner

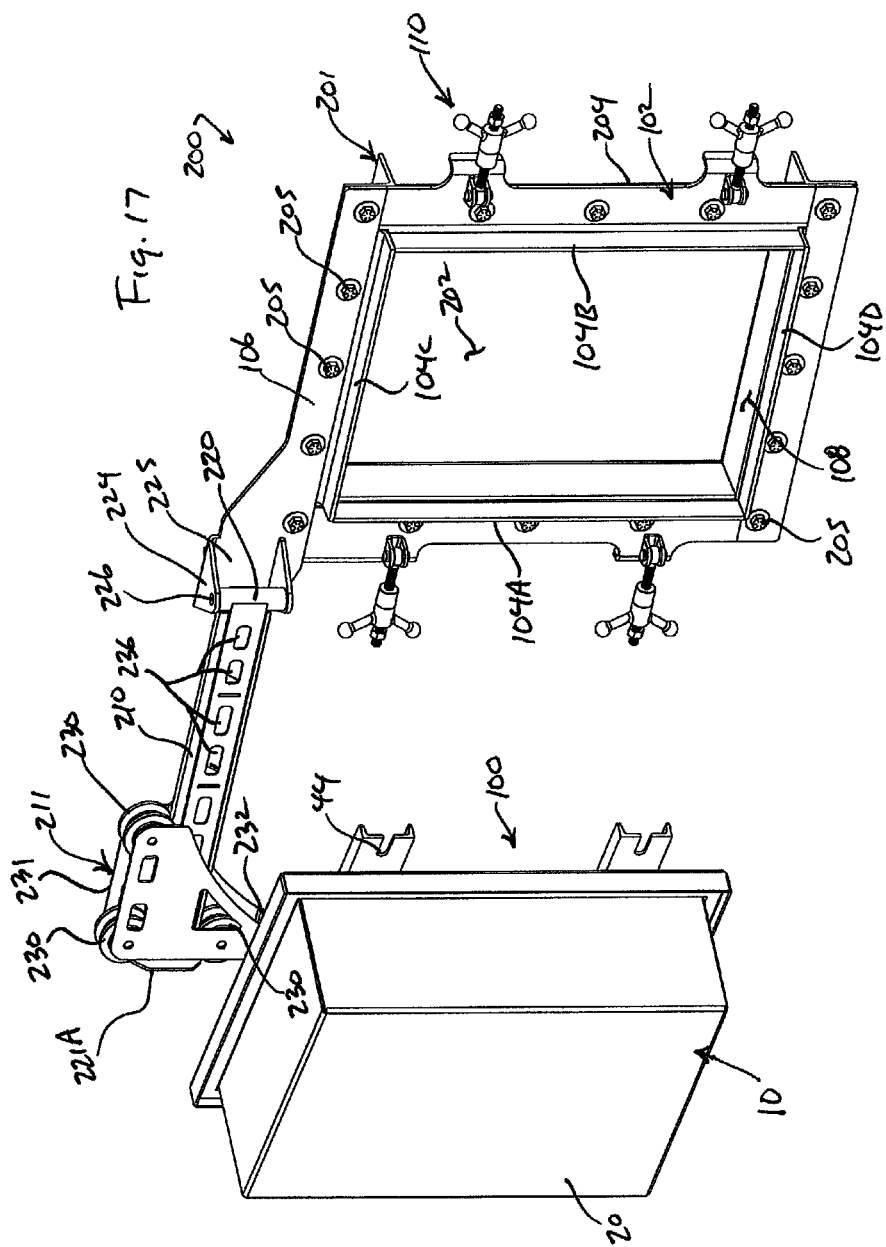

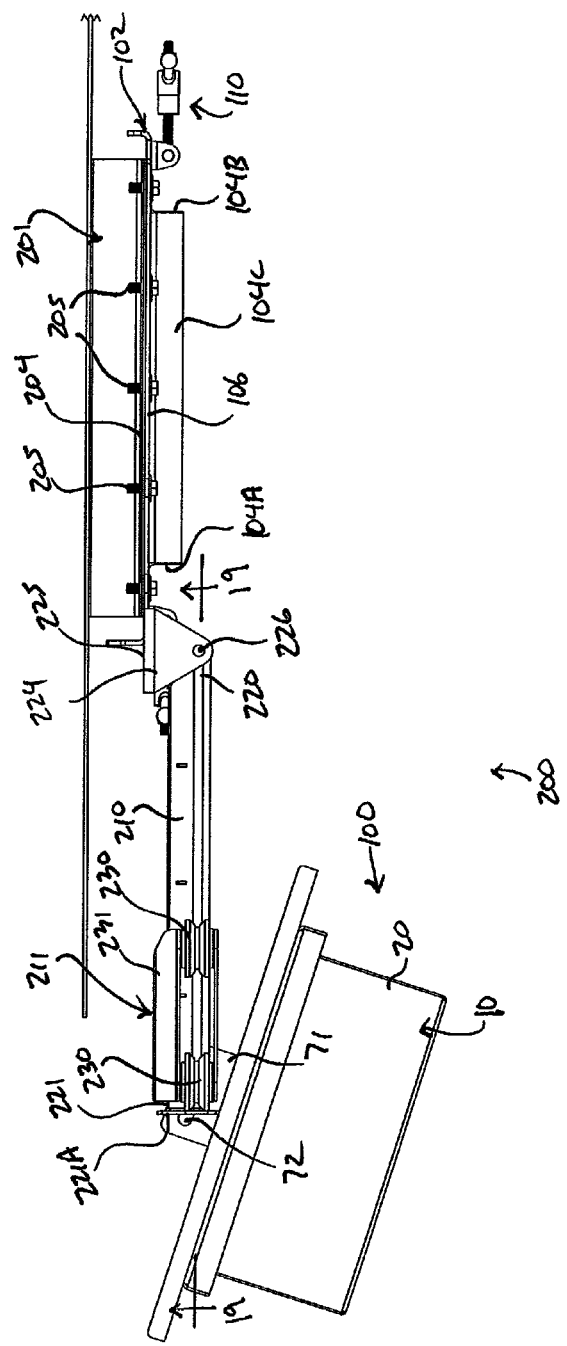

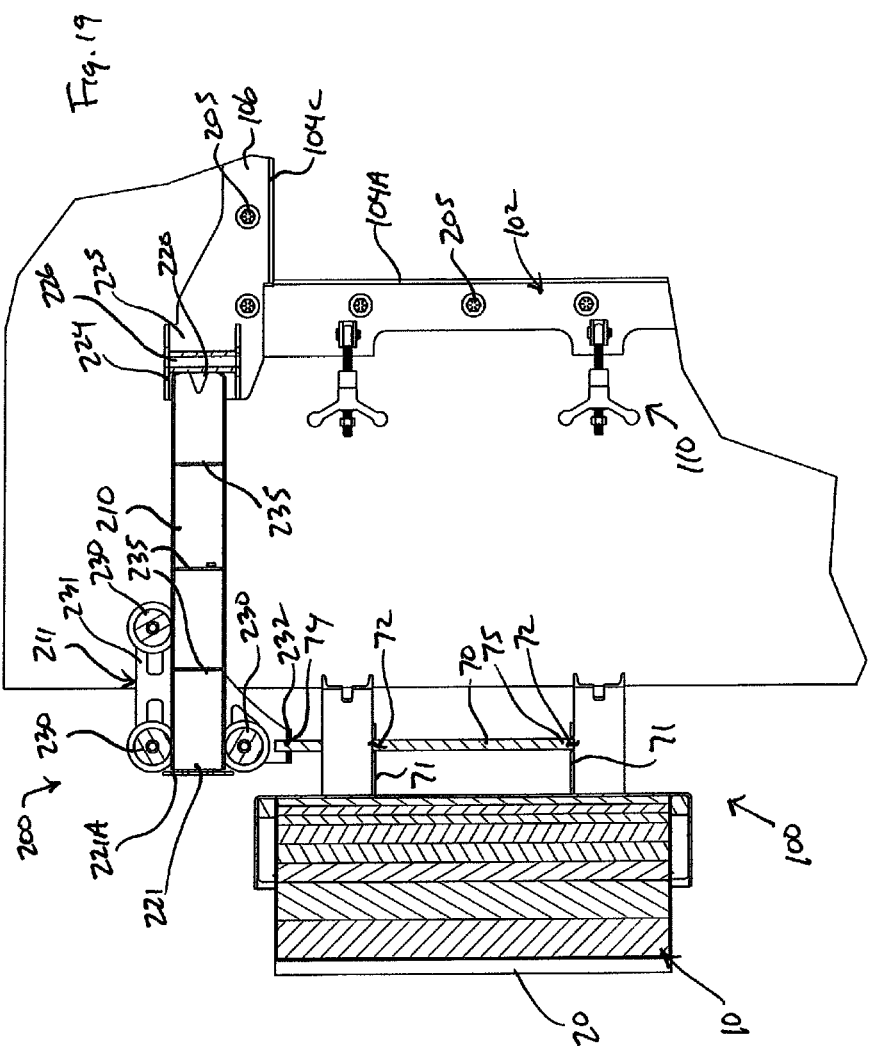

US 9,909,354 B1

DOOR APPARATUS WITH BOOM ASSEMBLY

FIELD OF THE INVENTION

The present invention relates to door assemblies.

BACKGROUND OF THE INVENTION

A heat recovery steam generator (HRSG) is an energy recovery heat exchanger that recovers heat from a hot gas stream, and produces steam useful in a process or driving a turbine that can be used in a process, or to drive a turbine for powering an electrical generator. Access doors are provided for entry into various sections of the HRSG, including the inlet duct and stack.

In a HRSG, a typical door is mounted to frame installed at the access opening that provides entry to the given section of the HRSG. Conventional doors used in HRSGs are bulky and substantial in size. Accordingly, conventional HRSG doors are unwieldy and difficult to open and to close, often requiring two or more people to open and close them, and often limit access to the access opening when they are open. This can also be the case with doors used with safes, bunkers, vaults, and the like. Given these and other deficiencies in the art, there is need for a door assembly that is easily opened and closed, and that is easily movable and adjustable when opened to enable it to be moved out of the way of the access opening for enabling access to the access opening without interference by the door.

SUMMARY OF THE INVENTION

According to the principle of the invention, a door apparatus includes a door frame, a mounted rotatably to the door frame, a truck mounted reciprocally to the boom, and a door mounted rotatably to the truck. The door is a door, in an illustrative embodiment. The door is in a closed position received by the door frame, when the boom is rotated toward the door frame, and when the door is rotated to an infacing position relative to the door frame. The door is in an open position withdrawn from the door frame, when the boom is rotated away from the door frame. The truck is disabled from reciprocating along the boom and the door is disabled from rotating, when the door is in the closed position received by the door frame. The truck is enabled for reciprocating along the boom and the door is enabled for rotating, when the door is in the open position withdrawn from the door frame. The truck is a wheelset that rolls on the boom. The door apparatus further includes a lock assembly for locking the door in the closed position.

According to the principle of the invention, a door apparatus includes a door frame, a boom, a truck, and a door. The boom includes an inner end and an outer end, and the inner end of the boom is mounted rotatably to the door frame. The truck is mounted reciprocally to the boom. The door is mounted rotatably to the truck. The door is in a closed position received by the door frame, when the boom is rotated toward the door frame, when the truck is reciprocated to an intermediate position along the boom between the inner end and the outer end of the boom, and when the door is rotated to an infacing position relative to the door frame. The door is in an open position withdrawn from the door frame, when the boom is rotated away from the door frame. The truck is disabled from reciprocating along the boom and the door is disabled from rotating, when the door is in the closed position received by the door frame. The truck is enabled for reciprocating along the boom and the door is enabled for rotating, when the door is in the open position withdrawn from the door frame. The truck is a wheelset that rolls on the boom. The door apparatus further includes a lock assembly for locking the door in the closed position.

According to the principle of the invention, a door apparatus includes a door frame, a boom, a truck, and a door. The boom includes an inner end and an outer end, and the inner end of the boom is mounted rotatably to the door frame about a first axis of rotation. The truck is mounted reciprocally to the boom. The door is mounted rotatably to the truck about a second axis of rotation. The first axis of rotation of the boom and the second axis of rotation of the door are parallel relative to the door frame, and are perpendicular relative to the boom. The door is in a closed position received by the door frame, when the boom is rotated toward the door frame, when the truck is reciprocated to an intermediate position along the boom between the inner end and the outer end of the boom, and when the door is rotated to an infacing position relative to the door frame. The door is in an open position withdrawn from the door frame, when the boom is rotated away from the door frame. The truck is disabled from reciprocating along the boom and the door is disabled from rotating, when the door is in the closed position received by the door frame. The truck is enabled for reciprocating along the boom and the door is enabled for rotating, when the door is in the open position withdrawn from the door frame. The truck is a wheelset that rolls on the boom. The door apparatus further includes a lock assembly for locking the door in the closed position.

BRIEF DESCRIPTION OF THE DRAWINGS

Referring to the drawings:

FIG. 17 is a view similar to that of FIG. 15 illustrating the boom rotated to an outer position and the door rotated to the outfacing position;

FIG. 18 is a top plan view of the embodiment of FIG. 17; and

FIG. 19 is a section view taken along line 19-19 of FIG. 18.

DETAILED DESCRIPTION

Figure 1:
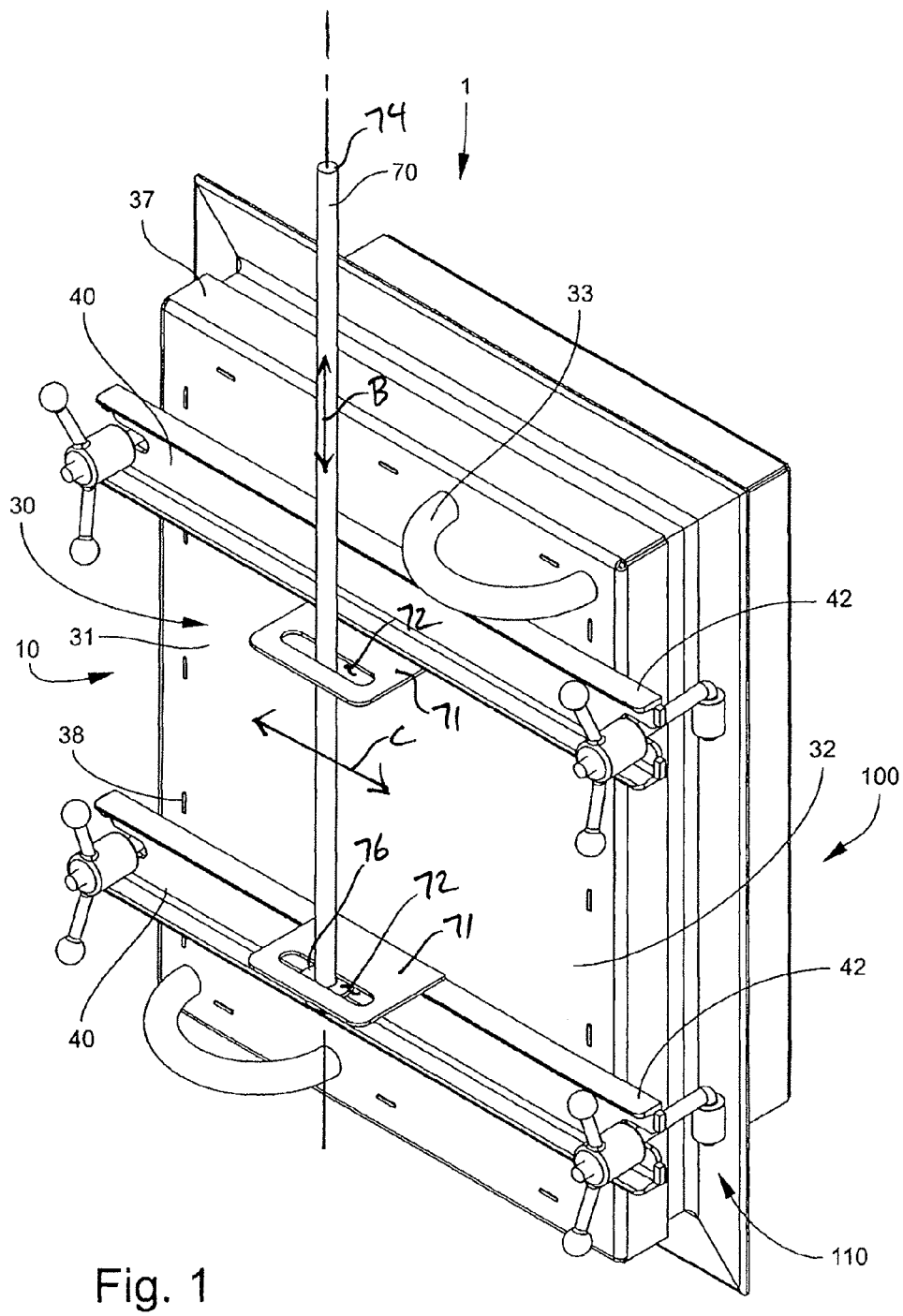
FIG. 1 is a front perspective view of a door kit constructed and arranged in accordance with the principle of the invention.
Figure 2:
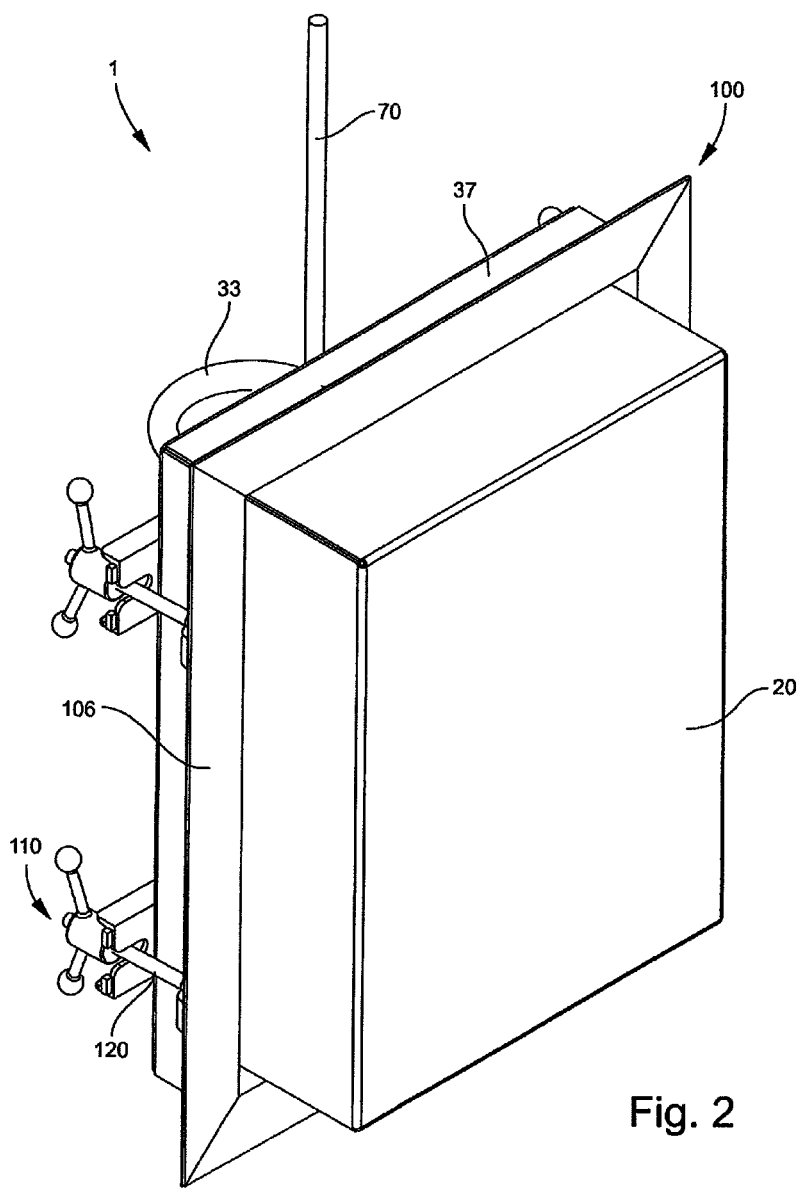
FIG. 2 is a rear perspective view of the embodiment of FIG. 1.

Turning now to FIGS. 1-7, in which like reference characters indicate corresponding elements throughout the several views, illustrated is an access door kit 1, which is useful for sealing access ports. Door kit 1 includes a door 10, a door frame assembly 100, and a lock assembly for securing or otherwise locking door 10 when it is in a closed position received by door frame assembly 100 for closing and sealing an access port. Door kit 1 is a HRSG door kit. Door 10 is an assembly, is a HRSG door, is useful for sealing HRSG access ports, and includes an insulation box 20, and a door face 30 attached to the insulation box 20. Door face 30 is larger in width and length than the insulation box 20 and projects around the perimeter of the insulation box 20. Cross beams 40 are attached to a front surface 32 of the door face 30. The cross beams 40, preferably channel beams, which are attached to the front surface 32 of the door face 30, are preferably attached in a parallel orientation. However, non-parallel attachment orientations are also considered to fall with the scope of the present invention. Each cross beam 40 is lightly longer than the width or height of the door face 30. This allows a portion of each end 42 of the cross beam 40 to project beyond the door face 30. Each end 42 of each cross beam 40 includes at least one bolt receiving groove 44, forming a part of the lock assembly useful for locking door 10 in its closed position received by frame assembly 100. The bolt receiving grooves 44 include a safety feature, which are offset key tabs 46 elongating the L-Bolt groove 44 to prevent any unintentional impact from allowing the door 10 from swinging open during use. Hence, wing nut bolts, discussed below and which also form part of the lock assembly, have to be loosened completely to allow the L-bolts, discussed below, to swing open from a locked position.

Door face 30 is a planar piece 31 having a series of slots 35 set back from the perimeter of the door face 30. Insulation box 20 is a five-sided open cuboid defining an interior volume 22, which is filled with an insulating material, such as a high temperature insulation wool, superimposed layers of heat-insulative material, or other selected heat-insulative material. Insulation box 20 includes tabs 25 located on the perimeter of the open face of the five-sided open cuboid. The series of corresponding slots 35 included in the door face 30 are arranged such that the tabs 25 located on the insulation box 20 are received by the slots 35. The tabs 25 are then welded to the front surface 32 of the door face 30, thereby securing the insulation box 20 to the door face 30.

Figure 11:
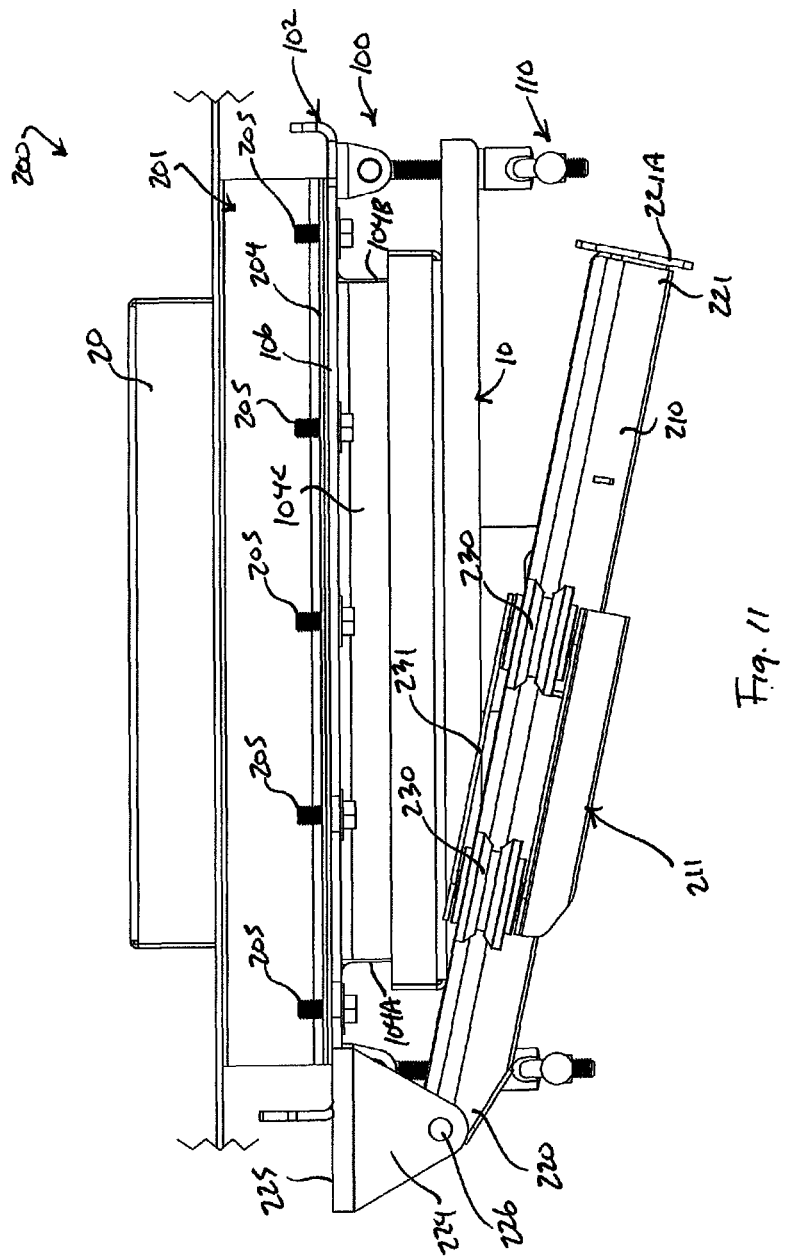
FIG. 11 is a top plan view of the embodiment of FIG. 9.

Door face 30 has an inwardly directed lip 37 that runs the perimeter of the door face 30 and that creates a channel 38 in FIG. 11 defined by the insulation box 20, the door face 30 and the door face lip 37. Located inside of the channel is a thermally insulating gasket 60. Thermally insulating gasket 60 substantially fills the channel and includes no perforations. Door face 30 also includes two handles 33, each located at opposite diagonal corners of the front surface 32 of the door face 30. These door handles 33 are ergonomically positioned on the door face 30 perimeter for easy maneuverability.

Door 10 is suspended from an upright tie rod 70. door 10 is mounted rotatably to tie rod 70, and is mounted reciprocally to tie rod 70 in both vertical and horizontal directions. Tie rod 70 is a suspension bracket. door 10 can be mated with many types of door suspension; i.e. Jib, Trolley, Swing Frame and the like. A bracket 71 is rigidly affixed, such as by welding, centrally to each cross beam 40. Brackets 71, one being an uppermost bracket and another being a lowermost bracket, are parallel relative to each other, are axially aligned vertically, and project laterally outwardly from front surface 32 of door face 30. A slot 72 is formed through each bracket 71. Slots 72 are equal in size, are elongate, are axially aligned vertically, and are parallel relative to front surface 32 of door face 30. Tie rod 70 extends vertically downward from an upper end thereof 74 through slots 72 to a lower end 75. Washer 76 encircles lower end 75 of tie rod 70 on the underside of the lowermost bracket 71, and is secured in place a nut 77 threaded onto lower end 75 under washer 76. The lowermost bracket 71 rests on washer 76, and brackets 71 tie or otherwise harness tie rod 70 to door 10, in which door 10 is suspended from tie rod 70.

Figure 3:
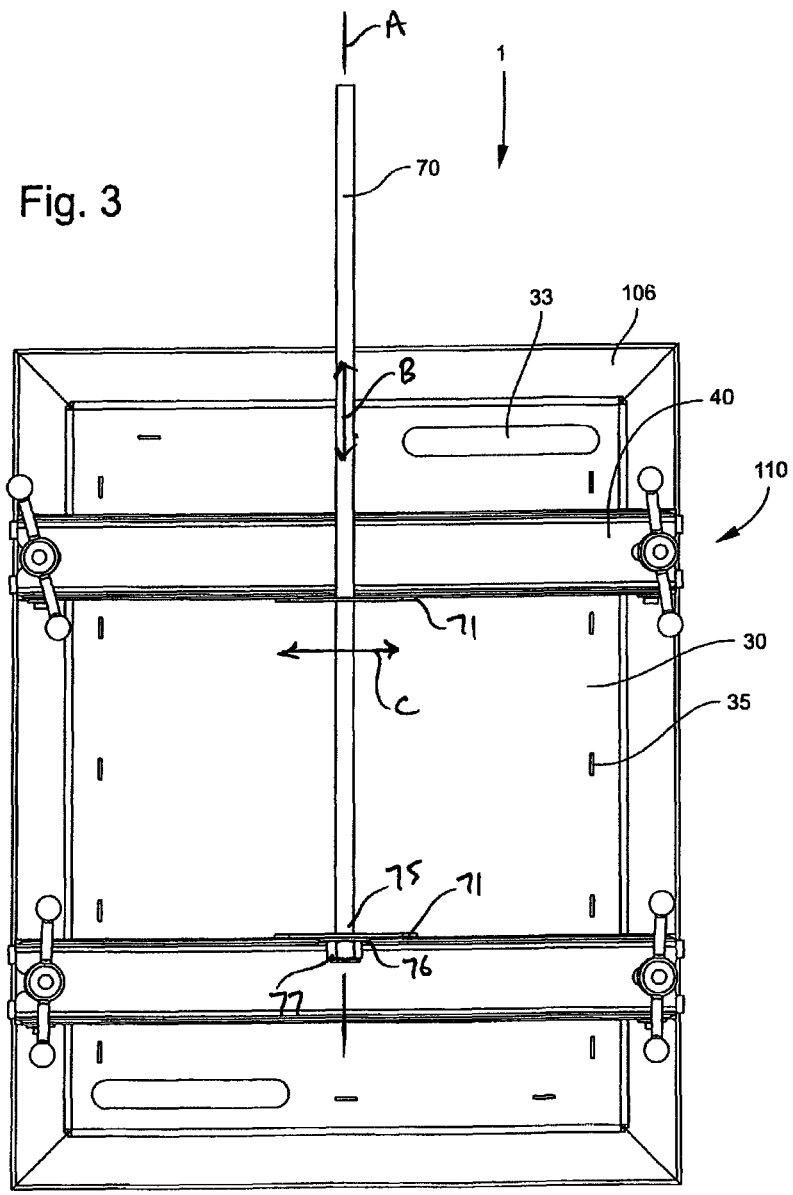
FIG. 3 is front elevation view of the embodiment of FIG. 1.
Figure 4:
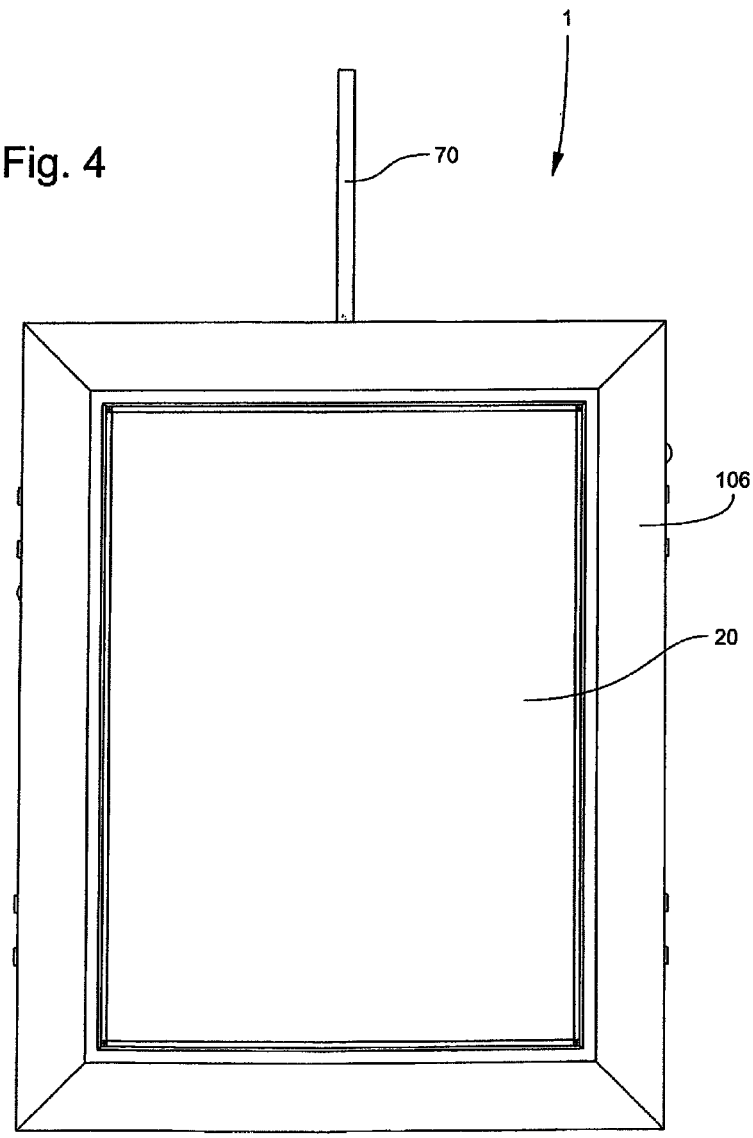
FIG. 4 is a rear elevation view of the embodiment of FIG. 1.
Figure 5:
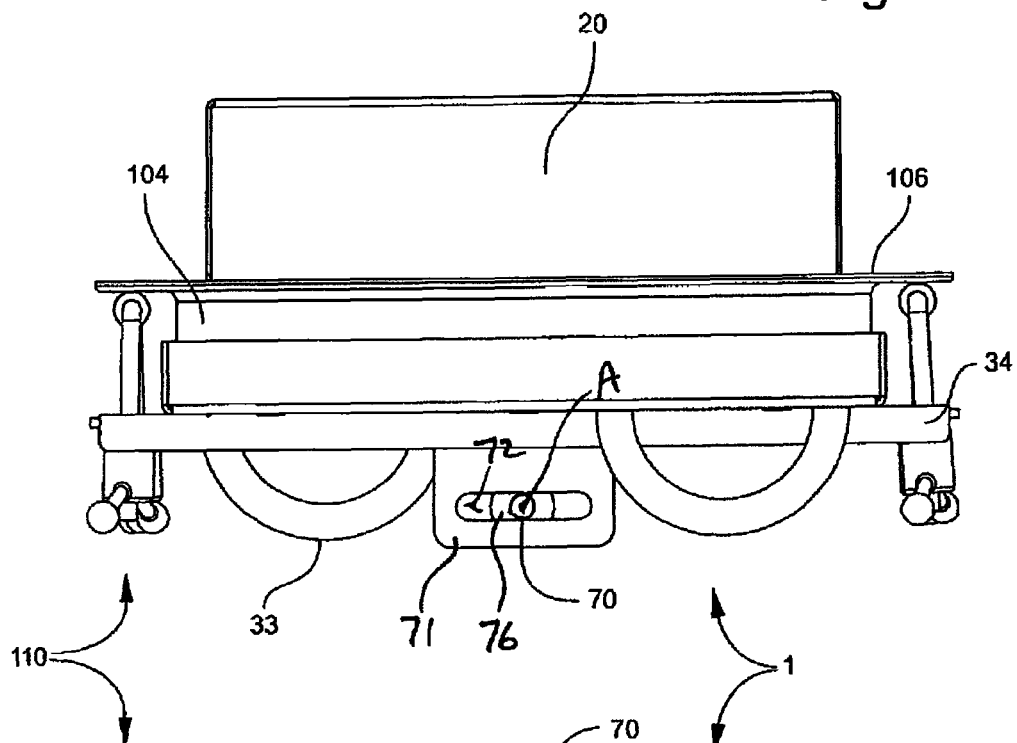
FIG. 5 is a top plan view of the embodiment of FIG. 1.
Figure 6:
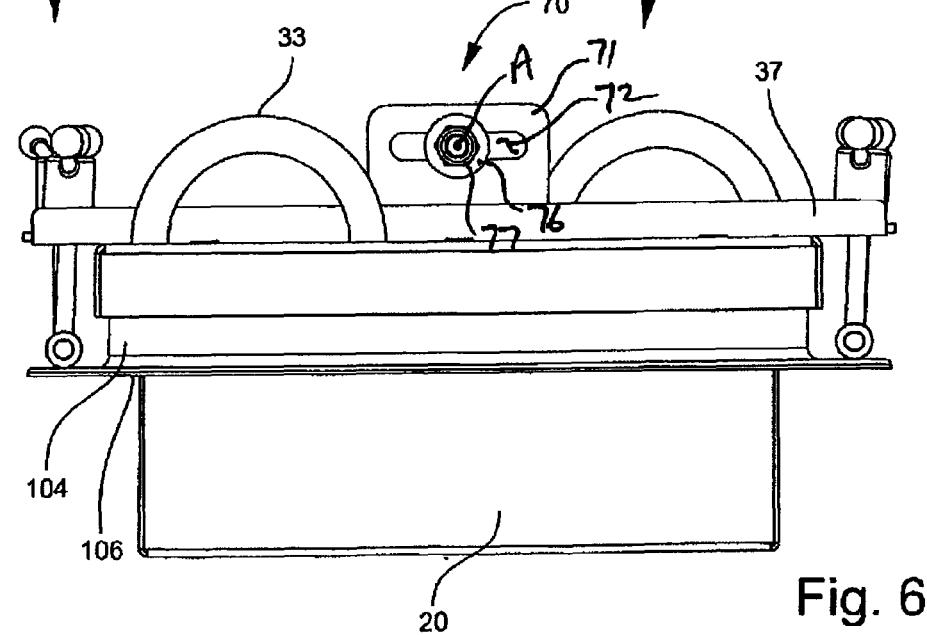
FIG. 6 is a bottom plan view of the embodiment of FIG. 1.
Figure 7:
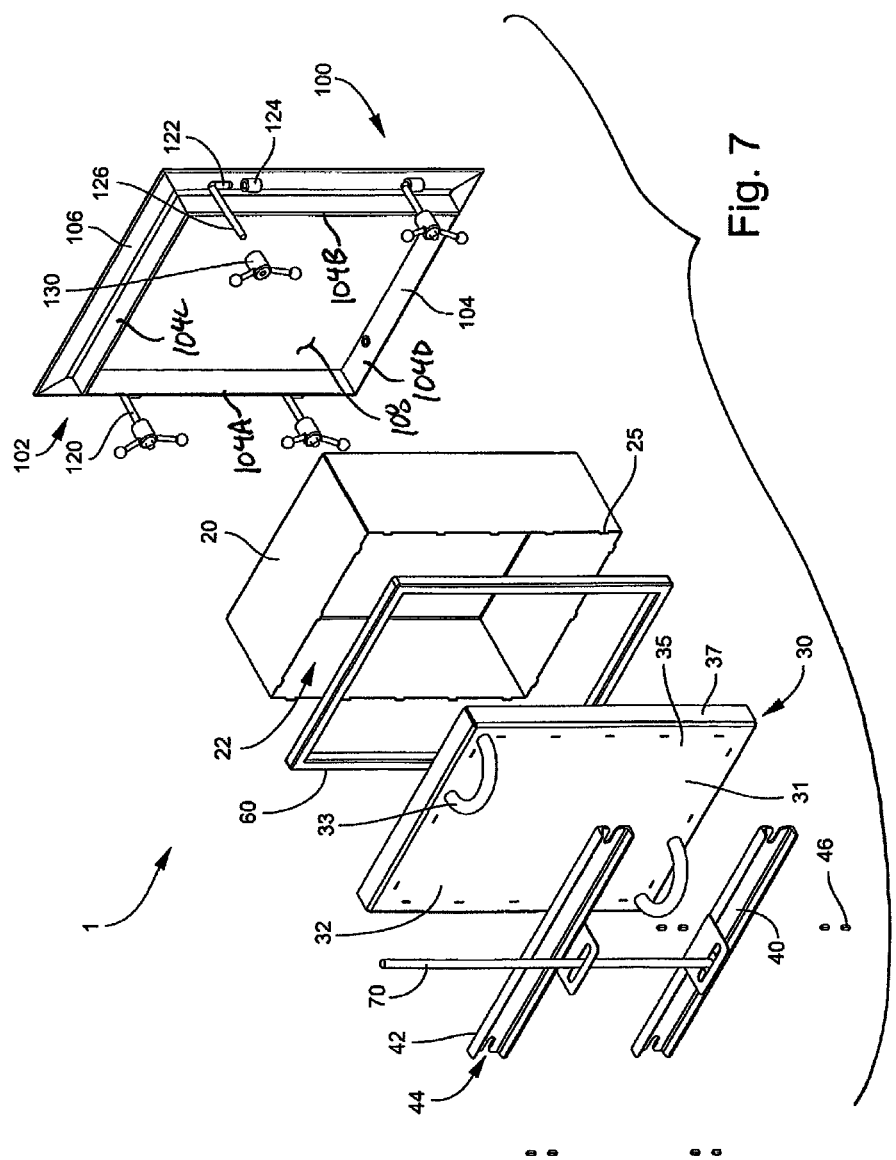
FIG. 7 is an exploded perspective view of the embodiment of FIG. 1.

In FIGS. 1 and 3, tie rod 70 extends along vertical longitudinal axis A, and is free to rotate in slots 72 (not shown in FIG. 3), which enables door 10 to rotate relative to tie rod 70 about longitudinal axis A. Axis A is an axis of rotation. Accordingly, door 10 is mounted rotatably to tie rod 70 for rotation about axis A of rotation. Tie rod 70 is free to reciprocate in slots 72 in both vertical and horizontal directions, which enables door 10 to reciprocate vertically relative to tie rod 70 along longitudinal axis A as indicated by double arrowed line B, and to reciprocate horizontally relative to longitudinal axis A of tie rod 70 from side-to-side as indicated by double arrowed line C. Accordingly, door 10 is mounted reciprocally to tie rod 70 in vertical directions along longitudinal axis A of tie rod 70 and horizontal directions from side-to-side relative to longitudinal axis A of tie rod 70.

The door frame assembly 100, a HRSG door frame assembly, includes door frame 102, a HRSG door frame, sized to receive the insulation box 20 in the closed position of door 10, and swing bolt assemblies 110 that forms a part of the lock assembly useful for locking door 10 when it is in a closed position received by door frame 102 of door frame assembly 100 closing and sealing a HRSG access port. In one embodiment the door frame 102 includes four elongate members 104, including opposed upright and parallel side members 104A and 104B and opposed horizontal parallel upper and lower end members 104C and 104D, that define an opening 108, which can be referred to as a door frame opening, sized to receive insulation box 20 of door 10 when door 10 is in its closed position. The four side pieces 104 may be welded, or formed directly around the perimeter of the portal. In an illustrative embodiment, elongate members 104 define a base flange 106 that extends around the perimeter of the elongate members 104 thereby providing a surface to secure the door frame assembly 100 to the portal frame, such as with nut-and-bolt assemblies.

The door frame assembly 100 includes swing bolt assemblies 110 that form part of the lock assembly. Each swing bolt assembly 110 includes at least one L or T shaped bolt 120, where at least one short leg 122 of the L or T shape is inserted into at least one lumen 124 securely attached to the door frame assembly 100; and a nut 130 that threadably attaches to the a terminal end 126 of the L or T shaped bolt 120. The L or T shaped bolts 120 are easily removably inserted into the at least one lumen 124 such that they are quick change fasteners. The L or T shaped bolts 120 can be removed and replaced in less than 60 seconds per bolt 120.

Using the swing bolt assembly 110 provides ingress/egress without the need for tools or specialized skill. This means that wrenches, sockets, air impact tools and the like are unnecessary; wing nut style nuts 130 may be tightened or loosened completely by hand. Further, use of the swing bolt assemblies 110 provides visual closure verification. One can visually verify that the door 10 is locked in its closed position applied to door frame 102 by the positioning of the L or T bolts making verification much easier compared to existing door models.

The door frame assembly 100 is preferably pre-fabricated and designed for quick and easy installation. Simply remove existing port access flange face and place the new pre-fabricated door frame assembly 100 over the remaining remnant of the previous flange face then align, clamp, and securely fasten.

Preferably, the access door kit 1 is coated with a thermal barrier (not shown) that coats the entire door assembly. This thermal barrier is a thermal ceramic coating for corrosion resistance and thermal performance. Further, this coating allows door to be painted if desired in order to match preexisting colors.

Figure 8:
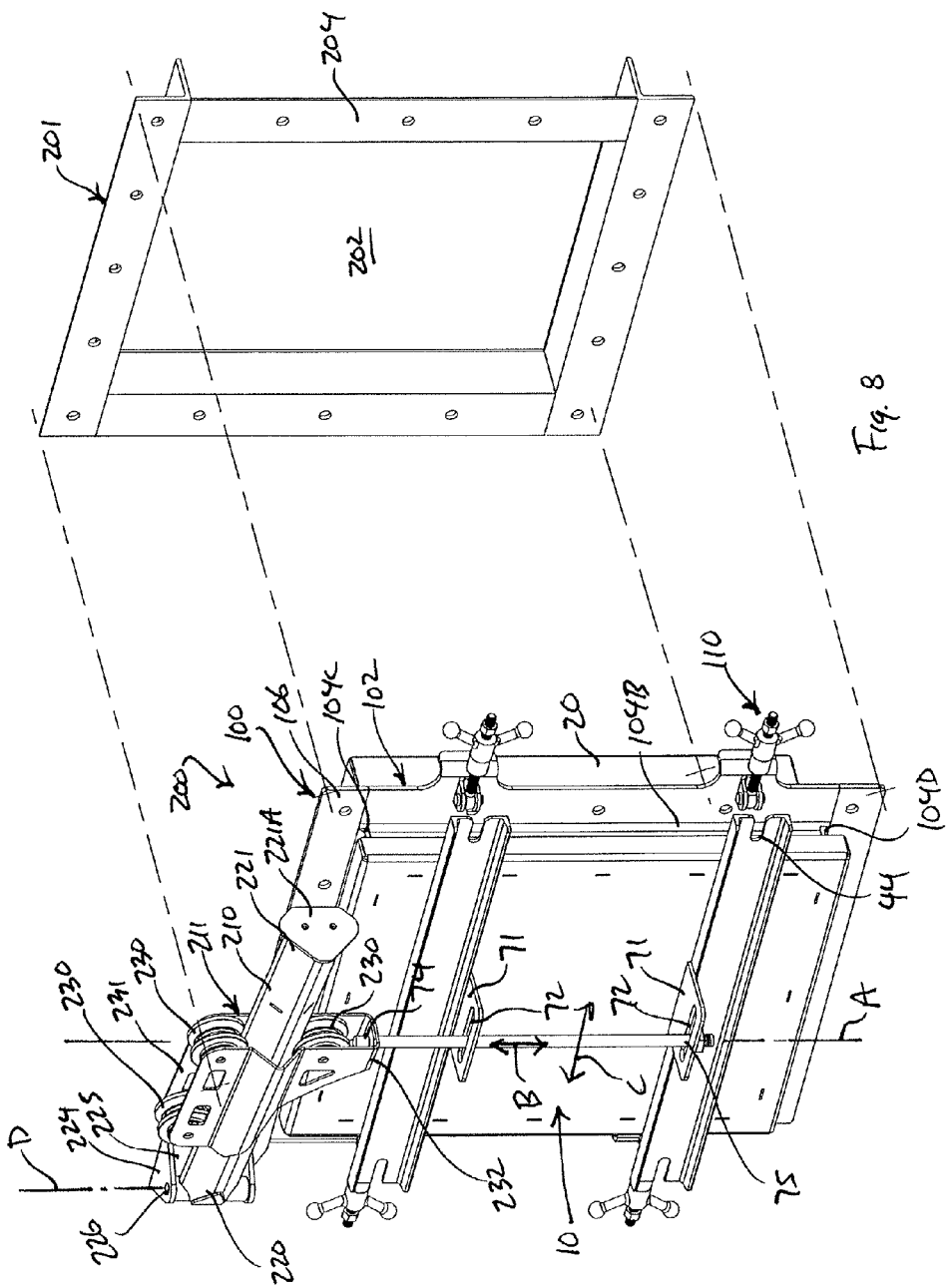
FIG. 8 is a perspective view of a door apparatus constructed and arranged in accordance with the principle of the invention and shown as it would appear in preparation for mounting to a portal frame installed at an access opening, the door apparatus includes a door frame, a boom rotated to the door frame, a truck reciprocated to the boom, and a door rotated to the truck, wherein the door is shown in a closed position received by the door frame, when the boom is rotated toward the door frame, when the truck is reciprocated to an intermediate position along the boom between an inner end and an outer end of the boom, and when the door is rotated to an infacing position.

Reference is now directed to FIGS. 8-19 illustrating a door apparatus 200 constructed and arranged in accordance with the principle of the invention. FIG. 8 is a perspective view of door apparatus 200 shown as it would appear in preparation for mounting to a portal frame 201 installed at an access opening 202 that provides entry to a given section or area. In an illustrative embodiment, door apparatus 200 is a HRSG door apparatus, portal frame 201 is a HRSG portal frame, and access opening 202 is a HRSG access opening that provides entry to a given section or area of a HRSG. Door apparatus can be configured as a safe door apparatus for use in safes, a bunker door apparatus for use in bunkers, a vault door apparatus for use in vaults, and the like.

Figure 9:
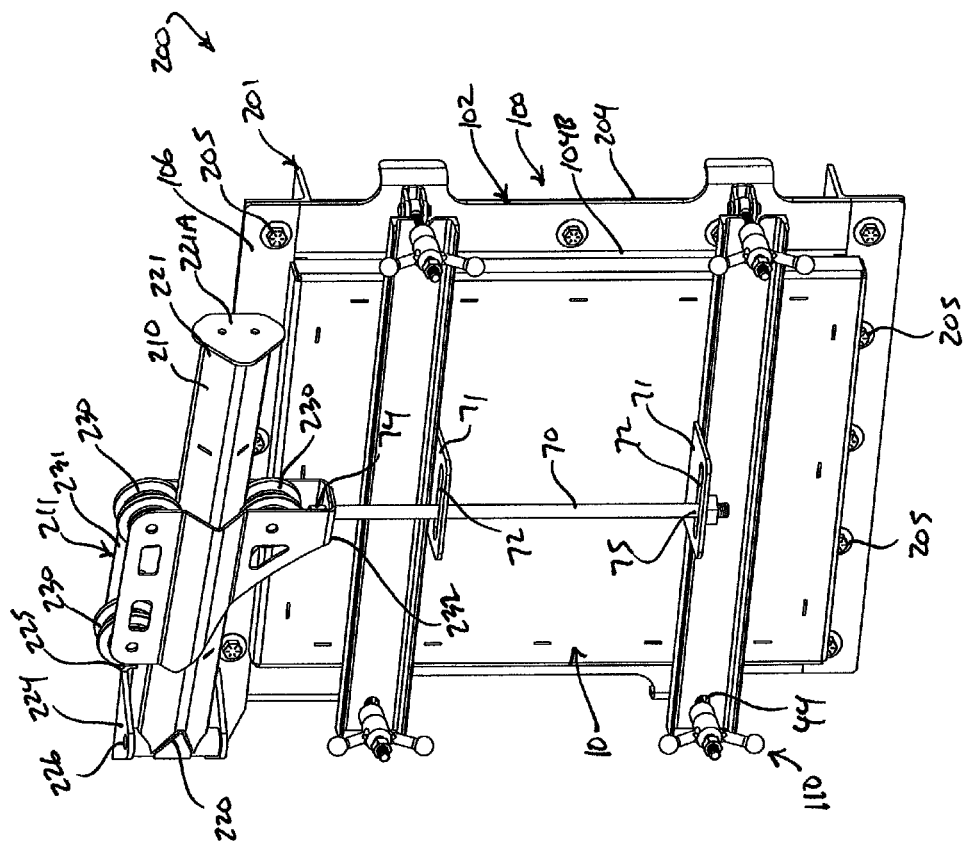
FIG. 9 is a view corresponding to FIG. 8 illustrating the door apparatus mounted to the portal frame.

In common with kit 1, door apparatus 200, which is entirely self-contained, shares the previously-described door 10, and door frame assembly 100. In door apparatus 200, door 10 is without the previously-described handles 33, and can be formed with such handles if desired. Door apparatus 200 further includes a boom 210, and a trolley or truck 211. Boom 210, a swing arm, is rotated to door frame 102. Truck 211 is reciprocated to boom 210. Door 10 is supported by truck 211. Boom 210 and truck 210 form a swing arm or boom assembly that supports door 10. FIG. 9 is a view corresponding to FIG. 8 illustrating door apparatus 200 mounted to portal frame 201, FIG. 10 is a front elevation view of the embodiment of FIG. 9, and FIG. 11 is a top plan view of the embodiment of FIG. 9, and FIG. 12 is a section view taken along line 12-12 of FIG. 9.

Figure 10:
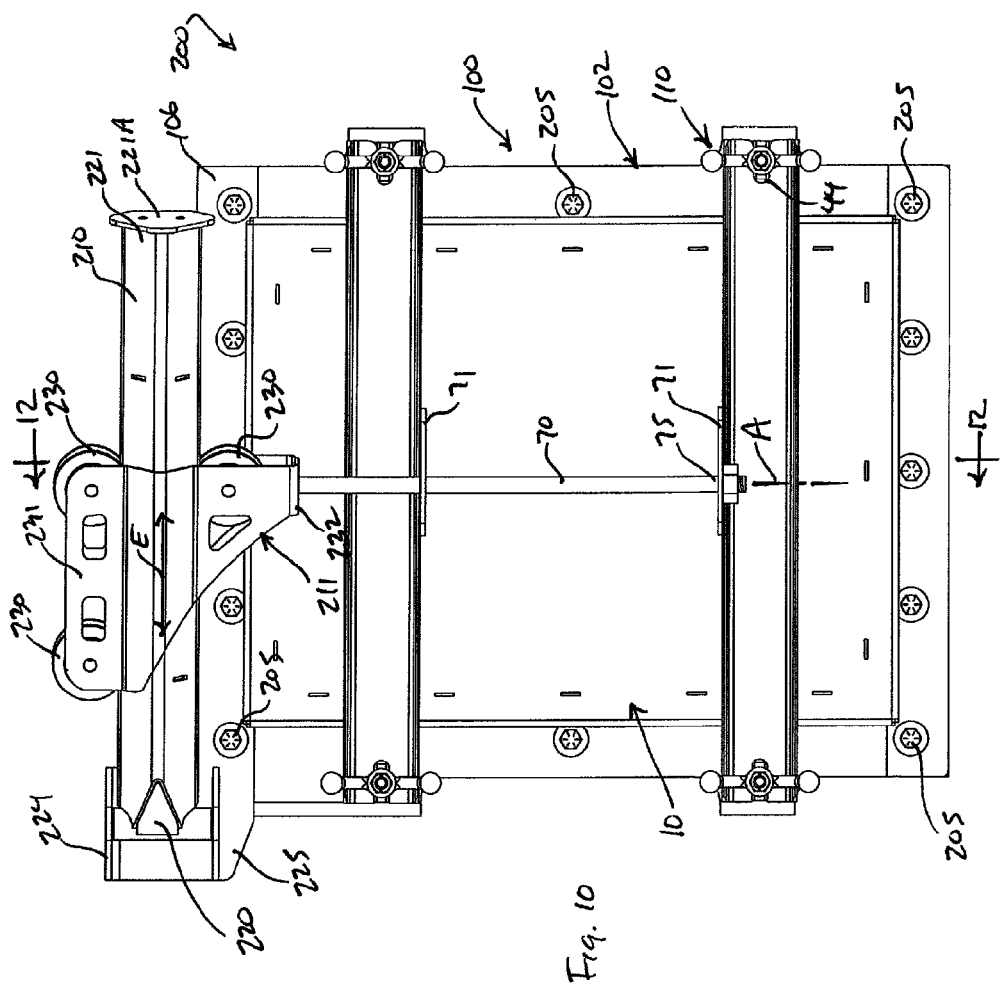
FIG. 10 is a front elevation view of the embodiment of FIG. 9.
Figure 12:
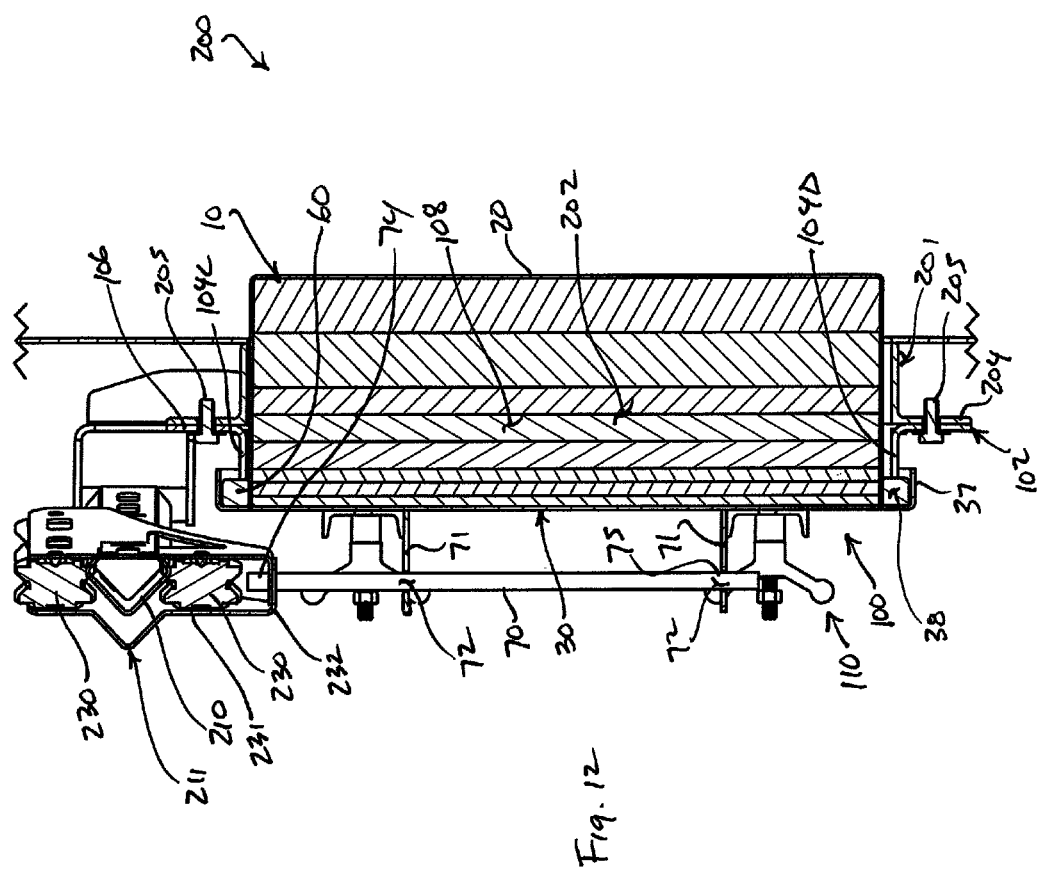
FIG. 12 is a section view taken along line 12-12 of FIG. 9.

To mount door apparatus 200 to portal frame 201, door 10 is placed in its closed position received by door frame 102, door apparatus 200 is positioned upright from lower member 104D to upper member 104 and boom 210 aligning opening 108 of door frame 102 and insulation box 20 with access opening 202 and aligning flange 106 with flange 204 in FIG. 1, insulation box 20 is inserted into access opening 202 and flange 106 is situated directly against flange 204 of portal frame 201 in FIG. 12, and flange 106 is then secured to flange 204 of portal frame 201 with nut-and-bolt assemblies 205 in FIGS. 9 and 10. The lock assembly, namely, the swing bolt assemblies 100 and the grooves 44, can be adjusted to not only lock door 10 in the closed position in FIGS. 9-12 closing access opening 204 in FIG. 12, but also unlock door 10 from the closed position, such as in FIGS. 13 and 15, for enabling the withdrawal of door 10 from access opening 202 and opening 108 of door frame 102 for enabling access to access opening 202, in accordance with the principle of the invention.

Figure 13:
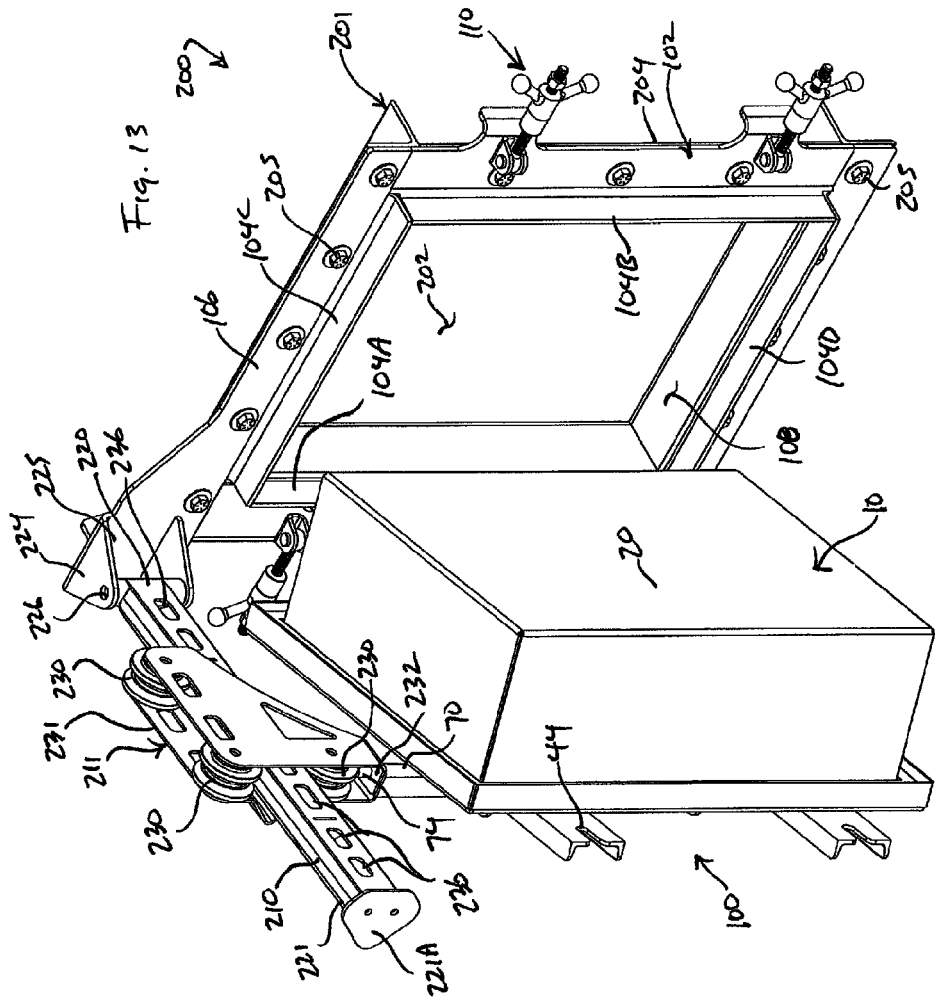
FIG. 13 is a view perspective view corresponding to FIG. 9 illustrating the door in an open position withdrawn from the door frame, when the boom is initially rotated away from the door frame.
Figure 14:
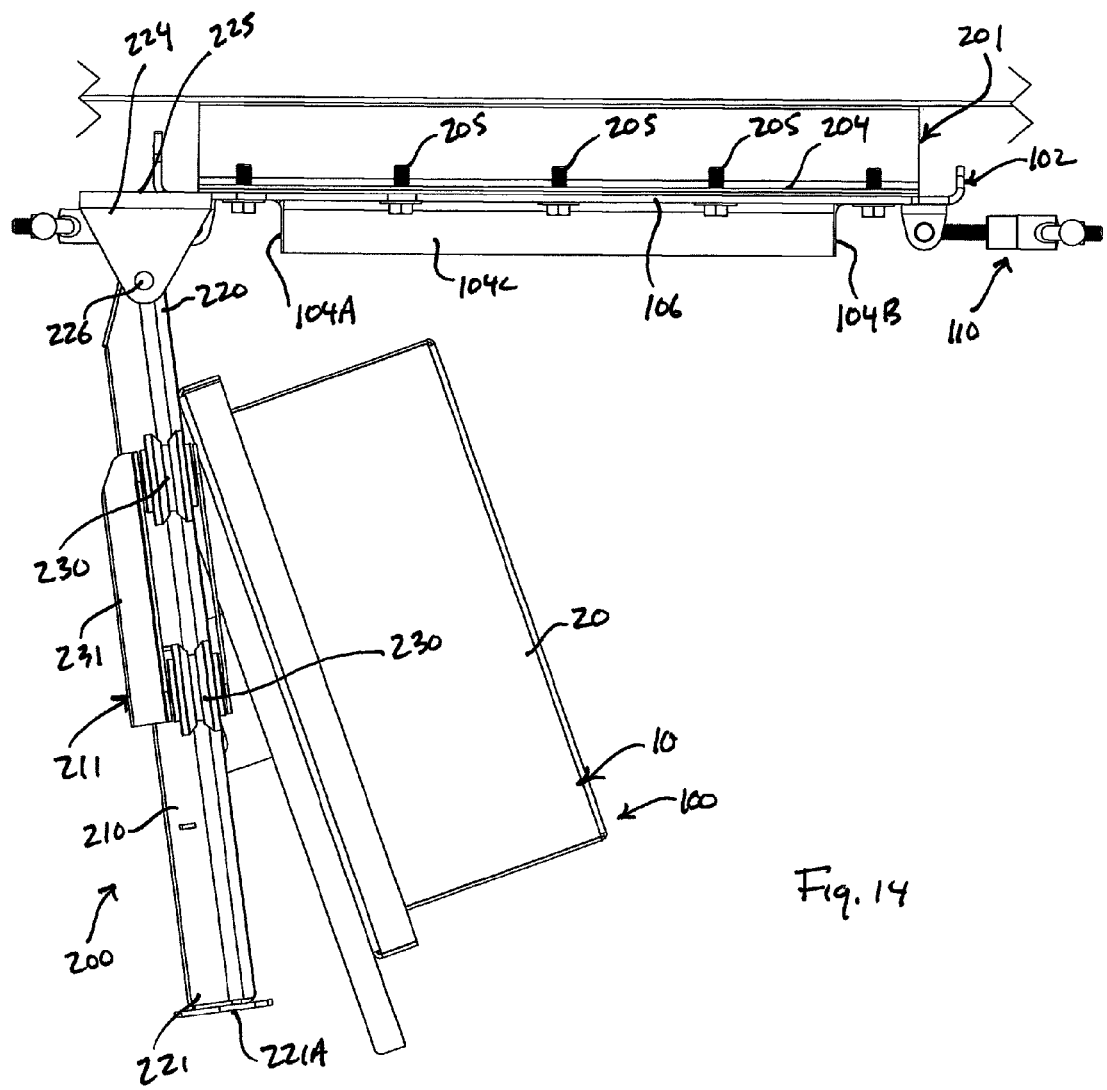
FIG. 14 is a top plan view of the embodiment of FIG. 13.
Figure 15:
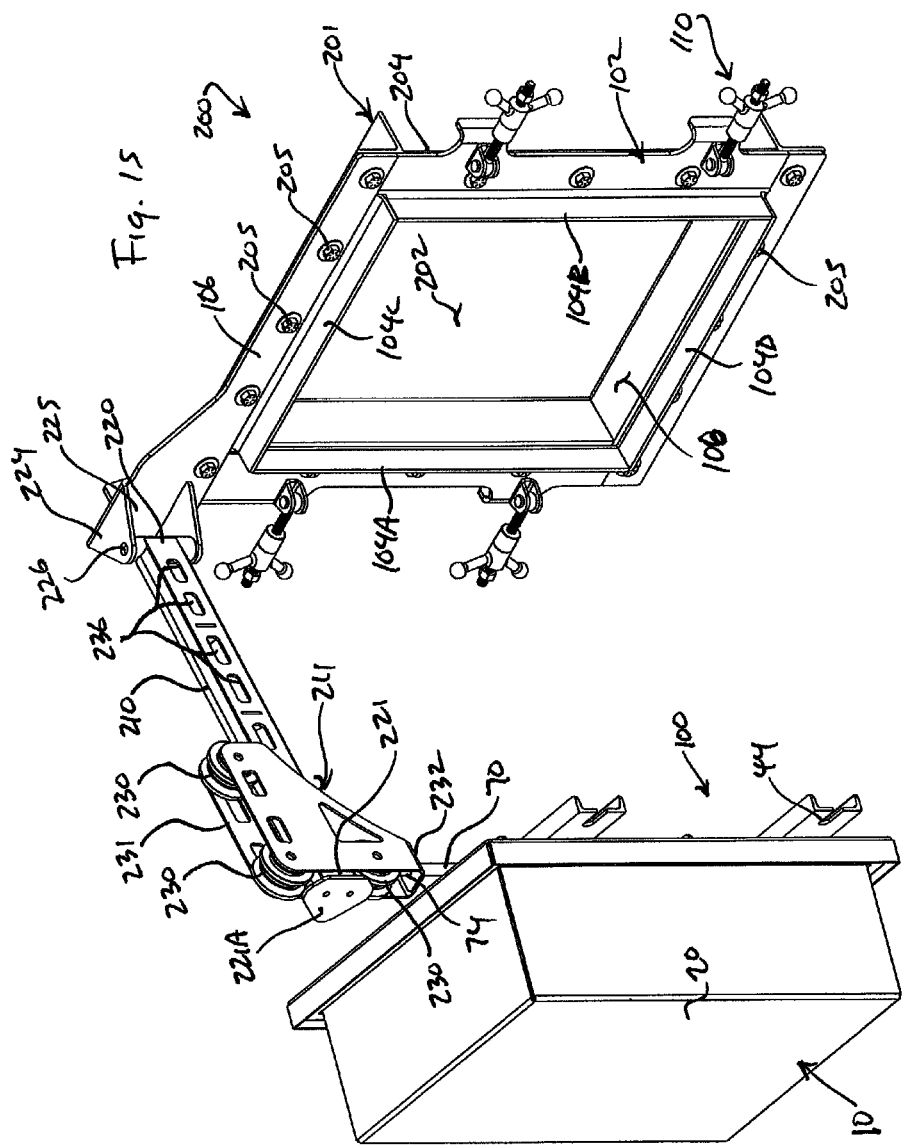
FIG. 15 is a view similar to that of FIG. 13 illustrating the door in an extended position corresponding to an extended position of the truck, and the door rotated to an outfacing position.
Figure 16:
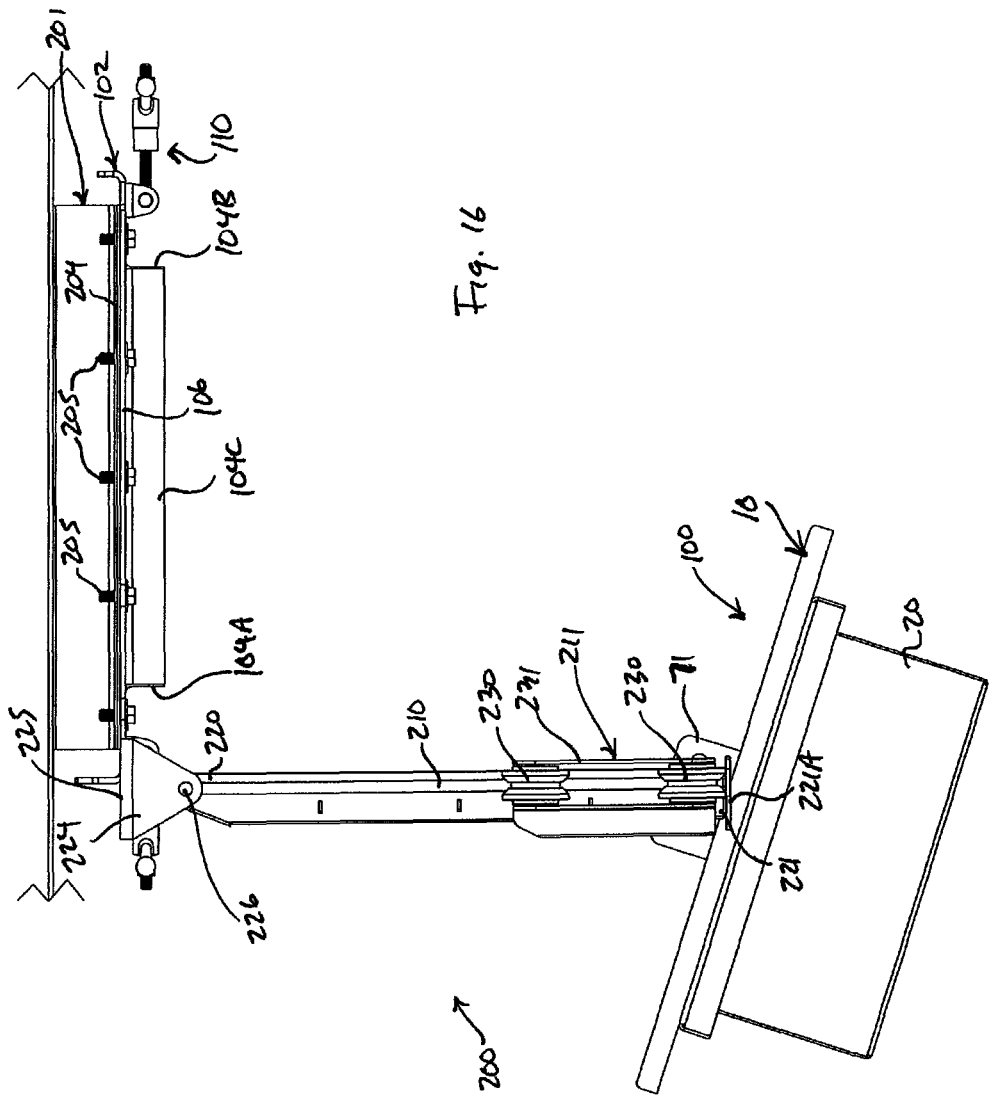
FIG. 16 is a top plan view of the embodiment of FIG. 15.

Boom 210 is horizontal and is elongate and straight and includes inner end 220 and outer end 221 and a length from inner end 220 to outer end 221. Inner end 220 of boom 210 is mounted rotatably to door frame 102 for rotation of boom 210 about axis D of rotation between an inner position of boom 210 toward the door frame 102 in FIGS. 8-12, and an outer position of boom 210 away from door frame 102 in FIGS. 17 and 18. FIGS. 13-16 illustrate boom 210 as it would appear rotated out of its inner position in FIGS. 8-12 to an intermediate position between its inner position in FIGS. 8-12 and its outer position in FIGS. 17 and 18. In FIGS. 13, 15, and 17, inner end 220 of boom 210 is rotated to a bracket 224 rigidly affixed to extension 225 of upper member 104C of door frame 102. Boom 210 is above opening 108 and is situated along a horizontal plane with upper member 104C, and extension 225 extends outwardly from side member 104A. Inner end 220 is rotated to bracket 224 with pivot pin 226, being exemplary of a knuckle joint. Boom 210 rotates between its inner and outer positions along the horizontal plane with upper member 104C.

Truck 211 is mounted reciprocally to boom 210 for movement in reciprocal directions along the length of boom 210 relative to inner and outer ends 220 and 221 indicated by double arrowed line E in FIG. 10. FIG. 8 shows truck 211 as it would appear reciprocated away from outer end 221 to toward inner end 220. FIGS. 15-19 show truck 211 is it would appear reciprocated to an extended position toward outer end 221 away from inner end 220. Door 10 registers with opening 108 of door frame 102 and access opening 202 and is carried or otherwise supported by truck 211. Door 10 is retracted, is in a retracted position, toward inner end 220 of boom 210 and away from outer end 221 of boom, when truck 211 is reciprocated to an inner or retracted position toward inner end 220 of boom 210 away from outer end 221 of boom. Door 10 is extended, is in an extended position, away from inner end 220 of boom 210 and toward outer end 221 of boom, when truck 211 is reciprocated away from inner end 220 of boom 210 to an outer or extended position toward outer end 221 of boom 210.

Truck 211 is a wheelset that rolls on boom 210 in reciprocal directions indicated by double arrowed line E in FIG. 10 relative to inner and outer ends 220 and 221 of boom 210. Truck 211 includes pulleys 230, two on the upper side of boom 210 and one on the lower side of boom 210 in this embodiment, rotated to a carriage 231 that extends downwardly along either side of boom 210 to a lower end 232 connected to upper end 74 of tie rod 70 from which door 10 is suspended. Pulleys 230 rotate on boom 210, which enables truck 211 to roll in reciprocal directions along the length of boom 210 between inner end 220 of boom 210 and outer end 221 of boom 210. Truck 211 is retracted, when truck 211 is reciprocated away from outer end 221 to inner end 220. Truck 211 is extended, when truck 211 is reciprocated away from inner end 220 to outer end 221. Outer end 221 of boom 210 is formed with a stop plate 221A, which engages truck 211 when truck 211 is in its extended position disabling truck 211 from moving beyond its extended position. Truck 221 is thereby captured on boom 210 between stop plate 221A and bracket 224.

Door 10 is suspended from truck 221, specifically lower end 232 of carriage 231. Lower end 232 of carriage 231 of truck 211 is connected, such as via welding, to upper end 74 of tie rod 70 of door 10, tie rod 70 extends vertically downward from upper end 74 connected to lower end 232 of carriage 231 to lower end 75, and door 10 is, in turn, suspended from tie rod 70 suspended from carriage 232 of truck 211. As explained above in conjunction with kit 1, door 10 is mounted rotatably to tie rod 70 for rotation about axis A of rotation of tie rod 70, and is mounted reciprocally to tie rod 70 in both vertical directions along longitudinal axis A of tie rod 70 and horizontal directions from side-to-side relative to longitudinal axis A of tie rod 70. Accordingly, door 10 is mounted rotatably to the truck 211 for rotation about axis A of rotation, and can be rotated between an infacing position relative to door frame 102 in FIGS. 8, 11, and 12, and an outfacing position relative to door frame 102 in FIGS. 15-18. Insulation box 20 is registered with or is otherwise directed toward opening 108 of door frame 102, when door 10 is rotated to its infacing position. Insulation box 20 is directed away from opening 108 of door frame 102, when door 10 is rotated to its outfacing position. Axis A of rotation of door 10 and axis D of rotation of boom 210 are parallel relative to each other and to door frame 102, and are perpendicular relative to boom 210.

Door 10 is in its closed position received by door frame 102, door apparatus 200 is positioned upright from lower member 104D to upper member 104 and boom 210 aligning opening 108 of door frame 102 and insulation box 20 with access opening 202 and aligning flange 106 with flange 204 in FIG. 1, insulation box 20 is inserted into access opening 202 and flange 106 is situated against flange 204 of portal frame 201 in FIG. 12, and flange 106 is secured to flange 204 of portal frame 201 with nut-and-bolt assemblies 205 in FIGS. 9 and 10, when door apparatus 200 is mounted to portal frame 201 and door 10 is in its closed position closing access opening 202. In this example, door 10 is in its closed position concurrently received by opening 108 of door frame 102 and access opening 202, when boom 210 is rotated to an inner position toward door frame 102 in FIGS. 9-12, when truck 211 is at an intermediate position along the length of boom 210 between inner and outer ends 220 and 221 in FIGS. 9-11, and when door 10 is in the infacing position in FIG. 12. Furthermore, truck 211 is disabled from reciprocating along boom 210 thereby disabling door 10 from reciprocating along the length of boom 210, door 10 is disabled from rotating out of the infacing position, and door 10 is disabled from moving in reciprocal directions in the vertical and horizontal directions, when door 10 is in the closed position applied to door frame 102. The interaction between door frame 102 and door 10 in the closed position of door 10 disables truck 211 from moving reciprocally along boom 210 thereby disabling door 10 from moving reciprocally along boom 210, disables door 10 from rotating out of its infacing position, and disables door 10 from moving in reciprocal directions in the vertical and horizontal directions. Again, the lock assembly, namely, the swing bolt assemblies 110 and the grooves 44, can be adjusted to lock door 10 in the closed position in FIGS. 9-12 closing access opening 204 in FIG. 12, and can be adjusted unlock door 10 from the closed position, such as in FIGS. 13 and 15, for enabling the withdrawal of door 10 from access opening 202 and opening 108 of door frame 102 for enabling access to access opening 202. Door 10 has an inherent weight, and boom 210 supports the inherent weight of door 10 when door 10 is moved out of its closed position.

Boom 210 is enabled for rotation out of its inner position toward door frame 102 and to its outer position away from door frame 102 for moving door 10 from its closed position to its open position opening access opening 202, when door 10 is in its closed position and when the lock assembly is unlocked. Door 10 is concurrently withdrawn from access opening 202 and opening 108 of door frame 102 initially opening door 10 for opening access opening 202, when boom 210 is rotated, such as by hand, out of its inner position in FIGS. 13-15 toward its outer position. FIGS. 13-15 illustrate door 10 in an initial open position withdrawn from door frame 102, including opening 108 of door frame 102 and access opening 202, when boom 210 is initially rotated out of its inner position away from door frame 102. From the intermediate position of boom 210 in FIGS. 13-15 between its inner and outer positions setting door 10 to an initial open position, boom 210 may be further rotated to its outer or outermost position in FIGS. 17 and 18 parallel to door frame 102 extending laterally outwardly from side member 104A. FIGS. 17 and 18 illustrate door 10 in an open position withdrawn from door frame 102 and positioned outboard of side member 104A of door frame 102, when boom 210 is rotated out of its inner position to its outer position, which enables unrestricted access to door access opening 202 with restriction from boom 210 or door 10. Door 10 is in an open position withdrawn from access opening 202 and opening 108 of door frame 102 in FIGS. 17 and 18, when boom 210 is in the outer position away from door frame 102.

Truck 211 is enabled for reciprocating along boom 210 thereby enabling door 10 for reciprocating along boom 210, door 10 is enabled for rotation, such as for rotation out of the infacing position to its outfacing position in FIGS. 15-18, and door 10 is enabled for reciprocating in the vertical and horizontal directions, when door 10 is in the open position withdrawn from opening 108 of door frame 102 and from access opening 202. The lack of interaction between door frame 102 and door 10 in the open position of door 10, that door 10 is free from door frame 102 in the open position of door 10, enables truck 211 to reciprocate along boom 210 thereby enabling door 10 to reciprocate along boom 210, enables door 10 to rotate about axis A of rotation, such as from its infacing position to its outfacing position in FIGS. 15-18, and enables door 10 to reciprocate in the vertical and horizontal directions relative to axis A of rotation of tie rod 70. The ability to rotate boom 210 and to move truck 211 in reciprocal directions along boom 210 to reciprocate door 10 along boom 210, and to rotate door 10 out of its infacing position to other positions, such as to its outfacing position, when door 10 is in an open position withdrawn from access opening 202 and opening 108 of frame 102, enables a user to position boom 210 and door 10 at selected locations and orientations for enabling unobstructed access to access opening 202 without interference from boom 210 and door 10, and for enabling a skilled worker to selectively access door 10 for maintenance and repair purposes.

To move door 10 from its open position back to its closed position received by opening 108 of frame 102 and to access opening 202, one need only reverse the process of moving door 10 form its closed position to an open position. To move door 10 from an open position back to its closed position, such as by hand, boom 210 is rotated toward its inner position from its outer position, door 10 is rotated to its infacing position, door 10 is reciprocated along boom 210 to an intermediate position of boom 210 between inner and outer ends 220 and 221 of boom 210 by reciprocating truck 211 along boom 210 to an intermediate position of boom 210 between inner and outer ends 220 and 221 of boom 210, and door 10 is reciprocated in the vertical and horizontal directions as needed by a skilled worker so as to register insulation box 20 with opening 108 of door frame 102 and access opening 202. Once insulation box 20 is registered with opening of door frame 102 and access opening 202, boom 210 is further rotated to its inner position inserting insulation box 20 through opening 108 of door frame 102 and into and through access opening 202. The lock assembly, namely, the swing bolt assemblies 100 and the grooves 44, can then be adjusted to lock door 10 in the closed position in FIGS. 9-12 closing access opening 204 in FIG. 12.

As explained above, door 10 has an inherent weight, and boom 210 supports the inherent weight of door 10 when door 1 is moved out of its closed position. To impart strength to boom 210, boom is triangular in cross section, is hollow and is formed with spaced-apart internal bulkheads 235 in FIG. 19 that provide structural reinforcement. In FIGS. 13, 15, and 17, spaced-apart cutouts are formed in boom 210 along the length of boom 210 form inner end 220 to outer end 221 for further structurally reinforcing beam 210.

The invention has been described above with reference to illustrative embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A door apparatus, comprising:
    a door frame;
    a boom mounted rotatably to the door frame;
    a truck mounted reciprocally to the boom;
    a door mounted rotatably to the truck;
    the door is in a closed position received by the door frame, when the boom is rotated toward the door frame, and when the door is rotated to an infacing position relative to the door frame;
    the door is in an open position withdrawn from the door frame, when the boom is rotated away from the door frame;
    the truck is disabled from reciprocating along the boom and the door is disabled from rotating, when the door is in the closed position received by the door frame; and
    the truck is enabled for reciprocating along the boom and the door is enabled for rotating, when the door is in the open position withdrawn from the door frame.

2. The door apparatus according to claim 1, wherein the truck comprises a wheelset that rolls on the boom.

3. The door apparatus according to claim 1, further comprising a lock assembly for locking the door in the closed position.

4. A door apparatus, comprising:
    a door frame;
    a boom, the boom includes an inner end and an outer end, the inner end of the boom is mounted rotatably to the door frame;
    a truck mounted reciprocally to the boom;
    a door mounted rotatably to the truck;
    the door is in a closed position received by the door frame, when the boom is rotated toward the door frame, when the truck is reciprocated to an intermediate position along the boom between the inner end and the outer end of the boom, and when the door is rotated to an infacing position relative to the door frame;
    the door is in an open position withdrawn from the door frame, when the boom is rotated away from the door frame;
    the truck is disabled from reciprocating along the boom and the door is disabled from rotating, when the door is in the closed position received by the door frame; and
    the truck is enabled for reciprocating along the boom and the door is enabled for rotating, when the door is in the open position withdrawn from the door frame.

5. The door apparatus according to claim 4, wherein the truck comprises a wheelset that rolls on the boom.

6. The door apparatus according to claim 4, further comprising a lock assembly for locking the door in the closed position.

7. A door apparatus, comprising:
    a door frame;
    a boom, the boom includes an inner end and an outer end, the inner end of the boom is mounted rotatably to the door frame about a first axis of rotation;
    a truck mounted reciprocally to the boom;
    a door mounted rotatably to the truck about a second axis of rotation;
    the first axis of rotation of the boom and the second axis of rotation of the door are parallel relative to the door frame, and are perpendicular relative to the boom;
    the door is in a closed position received by the door frame, when the boom is rotated toward the door frame, when the truck is reciprocated to an intermediate position along the boom between the inner end and the outer end of the boom, and when the door is rotated to an infacing position relative to the door frame;
    the door is in an open position withdrawn from the door frame, when the boom is rotated away from the door frame;
    the truck is disabled from reciprocating along the boom and the door is disabled from rotating, when the door is in the closed position received by the door frame; and
    the truck is enabled for reciprocating along the boom and the door is enabled for rotating, when the door is in the open position withdrawn from the door frame.

8. The door apparatus according to claim 7, wherein the truck comprises a wheelset that rolls on the boom.

9. The door apparatus according to claim 7, further comprising a lock assembly for locking the door in the closed position.

* * * * *